Patented Feb. 20, 1951

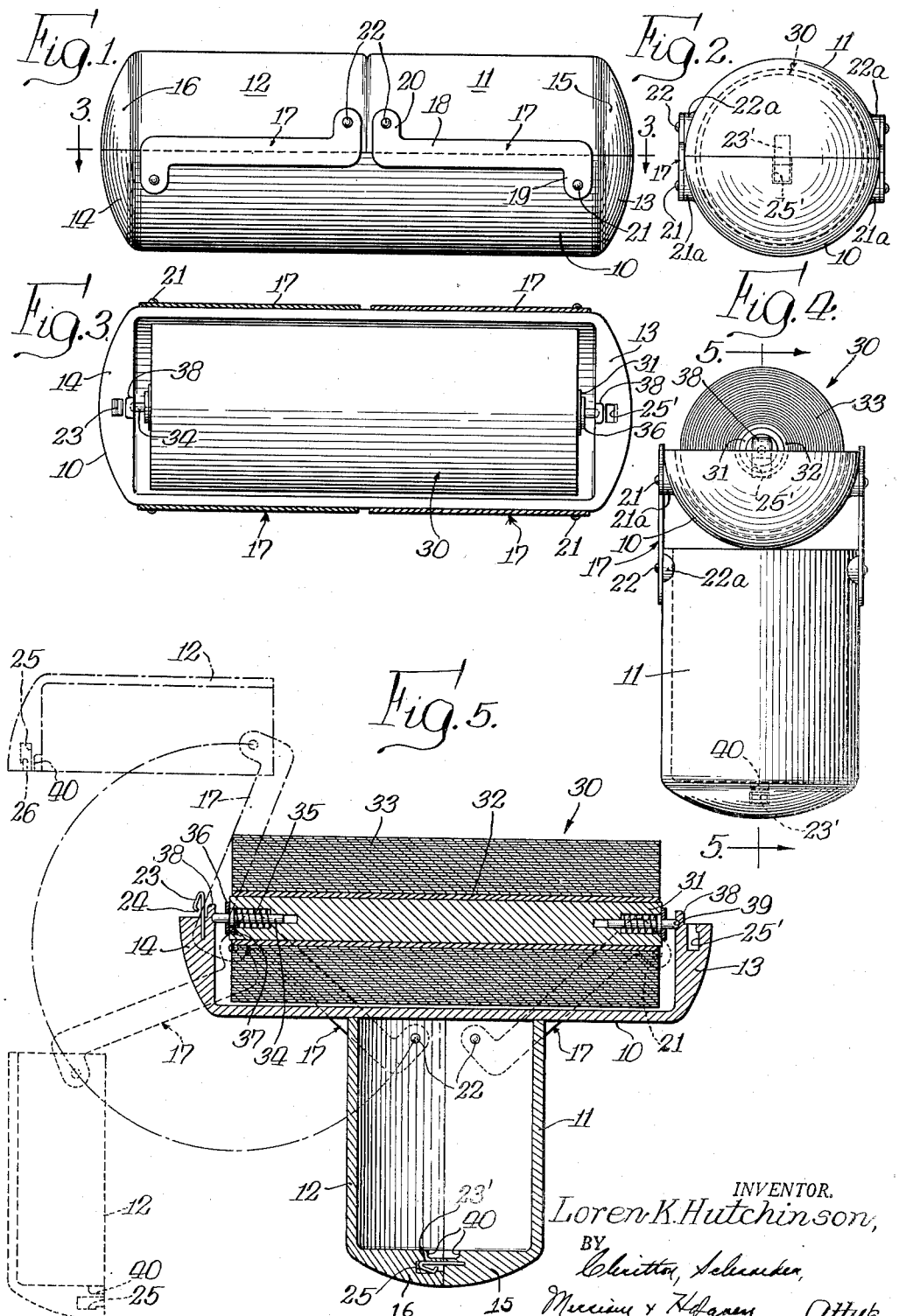

2,542,774

UNITED STATES PATENT OFFICE 2,542,774

CONTAINER WITH REPLACEABLE TACKY ROTARY DEVICE AND HAVING HANDLE FORMING PORTIONS

Loren K. Hutchinson, Chicago, Ill.

Application May 1, 1947, Serial No. 745,177

8 Claims. (Cl. 15—104)

The invention relates generally to a container and more particularly to a container for a replaceable contained device which is employed while supported in the container but exposed for use by opening of the container.

One object of the invention is to provide a new and improved container operable when closed to function as a casing or housing and operable when open to function as a handle for the manipulation of a device contained therein.

Another object is to provide a container which when closed is cylindrical in shape and when open forms a handle extending laterally of the axis of the container.

Another object is to provide a cylindrical container divided into halves along a longitudinal plane passing through the axis of the container with one of the halves divided transverely into quarters and hingedly connected to the other half to be swingable to a laterally extending handle-forming position.

A further object is to provide an elongated container and an elongated device rotatably and removably supported in the container with its axis extending longitudinally of the container, approximately one half of the side and ends of the container being removable to expose approximately one half of the device throughout the length thereof and swingable to a position forming a handle extending laterally of the axis of the device whereby the device may be rolled on a surface.

Other objects and advantages will become apparent from the following detailed description taken in connection with the accompanying drawings, in which:

Fig. 1 is a side elevational view of a container embodying the features of my invention.

Fig. 2 is an end elevational view of the container of Fig. 1.

Fig. 3 is a sectional view taken approximately along the line 3—3 of Fig. 1.

Fig. 4 is an end evelational view showing the casing in open position and with a rotatable device in the casing.

Fig. 5 is a sectional view taken approximately along the line 5—5 of Fig. 4 with various intermediate positions of the parts of the container shown in broken line outline.

While the invention is susceptible of various modifications and alternative construction, it is herein shown and will hereinafter be described in a preferred embodiment. It is not intended, however, that the invention is to be limited thereby to the specific construction disclosed. On the contrary, it is intended to cover all modifications and alternative constructions falling within the spirit and scope of the invention as defined in the appended claims.

The container forming the subject matter of this invention and shown in the drawing for purposes of disclosure is adapted to contain, more particularly, rotatably to support within it, a rotary device intended to be employed while supported in the container and upon exposure by removal of certain parts of the container; a feature of the container being that the parts removed to expose the rotary device serve to form a handle for utilizing the rotary device. As readily seen in the drawing, the container is tubular, more particularly, is in the form here shown cylindrical. It comprises a main part 10, auxiliary parts 11 and 12, and means for hingedly connecting the auxiliary parts to the main part. The main part 10 comprises half of the container and to that end is semitubular and preferably semi-cylindrical with end walls 13 and 14. Herein the end walls 13 and 14 increase in thickness as they extend radially inwardly toward the axis of the container so as to have a spherical external surface to enhance the appearance of the container while having a plain interior surface. The parts 11 and 12 compose the balance, that is, the remaining half of the container and jointly simulate the main part 10. Each of the parts 11 and 12 is, however, just one half the length of the main part 10. The part 11 has an end wall 15 and the part 12 has an end wall 16 for cooperation respectively with the end walls 13 and 14, the remaining ends of the parts 11 and 12 being open.

As above stated, the parts 11 and 12 are hingedly connected to the main part 10 in a manner such that they may be swung to the position shown in Figs. 1 and 2 wherein they complete or close the container and, alternatively, to the position shown in Figs. 4 and 5 wherein they form a handle extending laterally of the container at the middle thereof and in a direction away from the open portion of the container, and hence away from the exposed portion of any device that may be supported in the container. Each of the auxiliary parts 11 and 12 is hinged for independent movement with the hinge means taking the form of a pair of links 17. Each link 17 is in the form of a double, oppositely turned L with a main stem 18 and short, oppositely extending arms 19 and 20. The arm 19 of each link 17 is pivotally attached as by a pin, rivet or stud 21 to the main part 10 near the end and spaced just slightly from the edge thereof. The arm 20 of each link 17 is pivotally secured by a pin, rivet or stud 22 near the inner or open end of one of the auxiliary parts. Where the container is cylindrical, as here shown, bosses 21a and 22a are preferably formed on the parts at the point of attachment of the links, as best seen in Fig. 2. The links 17 for the auxiliary part 11 are connected to the main part 10 near the end wall 13 of the main part, while the links for the part 12 are connected to the main part near the end wall 14 thereof. As best seen in Figs. 1 and 5, the auxiliary parts 11 and 12 have a normal or inoperative position in which they close and complete the container. In this position, the open ends of the parts 11 and 12 abut and the parts lie parallel with the main part 10 with the ends 15 and 16 registering with the ends 13 and 14 respectively, so as completely to close the container and make it appear substantially as a unit. From that closed position, the parts 11 and 12 may be swung, as best seen in Fig. 5, to a handle-forming position. To that end, the parts 11 and 12 are swung about the pins 21 and are further pivoted relative to the links 17 about the pins 22. The parts thus end up, as clearly shown in Fig. 5, with the side edges rather than the ends abutting and forming a tubular handle extending transversely of the main part 10 and in a direction away from the open side or face of the main part. The open ends of the parts 11 and 12 bear against the main part 10 with the parts 11 and 12 thus forming a readily grasped and effective handle for manipulating or applying any device that may be supported within the container.

Locking means are provided herein for releasably securing the parts 11 and 12 in container-closing position and also in handle-forming position. The same locking means herein perform both functions. To that end, the wall 14 of the main part 10 carries a yieldable locking element 23. This element takes the form of a leaf spring embedded at one end in the end wall 14 at the center thereof and at the projecting end bent back upon itself somewhat in the form of an inverted V and then again bent inwardly to provide a lip 24. Formed in the end wall 16 of the auxiliary part 12 is a recess 25 in which the element 23 is received when the part 12 is positioned in container-closing position, shown in Figs. 1 and 2. The recess 25 is formed with a small inwardly facing shoulder 26 which cooperates with the lip 24 of the reversely bent part of the element 23 to hold the part 12 in locked position against accidental displacement. Similar locking means is provided for the part 11 with the elements forming the locking means reversed, however, for a purpose which will later be made more apparent. Thus the end wall 13 instead of having a spring element 23 is formed with a recess 25', and the end wall 15 of the part 11 instead of having a recess 25 is provided with a spring element 23'.

Because of the reversal of the parts forming the locking means, the same means, more particularly a portion thereof, also serve to lock the parts 11 and 12 to one another when in handle-forming position. As clearly seen in Fig. 5, the parts 11 and 12 in handle-forming position have their side edges, rather their open ends, in abutment and thus the end walls 15 and 16 register with one another the same as they register with the end walls 13 and 14 respectively in container-closing position. The locking element 23' thus is receivable in the recess 25 to lock the parts 11 and 12 together.

As indicated, the container is particularly adapted for the carrying and, especially, the supporting of a rotatable device, herein designated by the general reference character 30. The device 30 may be of a variety of constructions and serve a variety of purposes. Primarily, however, the device 30 will be one that is used when partially exposed by removal of the parts 11 and 12 but still supported in the container. Shown herein, by way of example, is a device for removing dandruff, hair, lint, dust and similar foreign and unsightly particles from wearing apparel, cloth or fabric surfaces and other surfaces to which such particles tend to cling. The device is composed of a core 31 of wood or some suitable material and a sleeve 32 which usually will be of cardboard and which is receivable over the core with a slight friction fit. Wound on the sleeve 32 to the depth of a considerable number of layers is a continuous strip 33 of a material whose outwardly directed surface is tacky enough to pick up dandruff, hair, lint, etc. from wearing apparel or a cloth surface but which does not leave the strip and adhere to the cloth. Since the tacky surface will, after use of the device for a period of time, become so coated with particles picked up from the garments or surfaces being cleaned as to lose some of its effectiveness, provision is made for conveniently stripping one layer of the material from the device and thus successively providing new, effective surfaces. To that end, the strip preferably is perforated transversely at intervals such that approximately one layer may be stripped and torn off at a time. At each end the core 31 is provided with a pin 34 serving as an axis about which the core and the material wound thereon rotate. Each pin 34 is urged outwardly by a spring 35 and is restrained against loss by any of the conventional methods including a plate 36 secured to the core and a collar 37 fast on the pin 34.

In order that the device 30 may be journaled on the center line or axis of the container, even though the container is divided on a plane passing through the axis, the main part 10 has a small projection 38 upstanding from each the end wall 13 and the end wall 14. At the projection 38, each end wall is formed with a recess 39 in which the projecting ends of the pins 34 are received and journaled. To accommodate the projections 38, the parts 11 and 12 are provided with recesses 40 in which the projections are received when the parts 11 and 12 are returned to container-closing position. It will be appreciated from the foregoing that the device 30 is readily removable and replaceable and that, where the device is consumed in use, either the entire device may be replaced or refills consisting of the sleeve 32 and the material outwardly thereof may be slipped over the core 31.

It is believed readily apparent from the foregoing that I have perfected a unique container and, particularly, a unique combination of container and device to be rotatably supported in the container and exposed for use while in the container. The container, when closed, is neat and completely conceals and encompasses the device contained therein to protect other devices or materials from it, for it is conceivable that the device rather than being something employed in grooming, as herein described, might be any one of a plurality of other devices. The container is readily and conveniently opened to expose the device for use, and moreover, the parts of the container removed to expose the device may be swung to a position to form a handle that may be grasped in utilizing the device. The container with all its advantages is still of simple construction, has a minimum number of parts, and readily adapts itself to economical manufacture by casting of the parts either of some lightweight metal or of one of the plastics.

I claim as my invention:

1. A container comprising a semi-tubular main part with end walls, a pair of auxiliary parts each semi-tubular in shape and of half the length of said main part, one end of each of said auxiliary parts being open and the other end having an end wall, and hinge means for each of said auxiliary parts swingably connecting the same to said main part, said auxiliary parts being swingable alternatively to a position in which the open ends thereof abut to close the container and to a position in which the edges abut and the parts form a tubular handle extending laterally of said main part away from the open side thereof.

2. A container comprising a semi-tubular main part, a pair of auxiliary parts each semi-tubular in shape and of half the length of said main part, and hinge means for each of said auxiliary parts swingably connecting the same to said main part to be swingable alternatively to a position in which the auxiliary parts lie parallel with the main part and in end to end abutting relationship or to a position in which the auxiliary parts have a right angular position relative to said main part and with their edges in abutment to form a tubular handle, said hinge means for each of said auxiliary parts comprising a pair of links disposed on diametrically opposed sides of the container, each link being pivoted at one end to said main part near the end thereof and pivoted at the other end to the auxiliary part near the inner end thereof.

3. A container comprising a semi-tubular main part, a pair of auxiliary parts each semi-tubular in shape and of half the length of said main part, said main part having an end wall at each end and said auxiliary parts each having an end wall at but one end, hinge means for each of said auxiliary parts pivotally connecting the same to said main part and enabling each of said auxiliary parts to be swung to a position parallel with said main part to complete the container and alternatively to a position at right angles to said main part and with their edges in abutting relationship to form a tubular handle, and means for releasably locking said auxiliary parts in container-closing or handle-forming position, said locking means comprising complementary cooperating elements one in each of the end walls of the container, the elements adapted to lock one of the auxiliary parts to said main part being reversed with respect to the other pair of elements to adapt the elements carried by said auxiliary parts for locking said auxiliary parts in handle-forming position.

4. A container comprising a semi-tubular main part, a pair of auxiliary parts each semi-tubular in shape and of half the length of said main part, said main part having an end wall at each end and said auxiliary parts each having an end wall at but one end, hinge means for each of said auxiliary parts pivotally connecting the same to said main part and enabling each of said auxiliary parts to be swung to a position parallel with said main part to complete the container and alternatively to a position at right angles to said main part and with their edges in abutting relationship to form a tubular handle, and means for releasably locking said auxiliary parts in container-closing or handle-forming position, said locking means comprising a headed leaf spring element projecting from one end wall of said main part and a shouldered recess formed in the other end wall of said main part and adapted to receive and hold releasably therein an element similar to said first named element carried by the end wall of the one of said auxiliary parts whose end wall is intended to abut the end wall containing said recess, and a recess similar to said first named recess formed in the end wall of the remaining one of said auxiliary parts.

5. A container for a rotatable element supported therein comprising a semi-cylindrical main part having an end wall closing each end thereof, a pair of auxiliary parts each semi-cylindrical in shape and of half the length of said main part, one end of each of said auxiliary parts being open and the other end having an end wall, hinge means for each of said auxiliary parts swingably connecting the same to said main part to enable said auxiliary parts to be swung alternatively to container-closing position and to handle-forming position at right angles to said main part, and a projection extending from each end wall of said main part in the plane of the wall and into the space occupied by the end wall of each auxiliary part when in closed position and having a recess therein forming a bearing for the rotatable element and a recess in the end wall of each of said auxiliary parts for accommodating said projections when said auxiliary parts are in container-closing position.

6. In combination a container comprising a semi-tubular main part having end walls, a pair of auxiliary parts each semi-tubular in shape and of half the length of said main part, and hinge means for each of said auxiliary parts swingably connecting the same to said main part to enable said auxiliary parts to be swung alternatively to a closed position parallel to said main part or to a position in which they extend at right angles to said main part to form a handle, and a device rotatably supported in the main part of said container to be exposed for use as an incident to swinging of said auxiliary parts from closed position to handle-forming position.

7. In combination, a container comprising a semi-tubular main part having end walls, bearing-forming shaft-receiving means carried by each of the end walls of said main part, a pair of auxiliary parts each semi-tubular in shape and of half the length of said main part, and hinge means for each of said auxiliary parts swingably connecting the same to said main part to enable said auxiliary parts to be swung alternatively to a closed position parallel to said main part or to a position in which they extend at right angles to said main part to form a handle, and a device rotatably and removably supported in the main part of said container to be exposed for use as an incident to swinging of said auxiliary parts from closed position to handle-forming position, said device including shaft-like means projecting from each end thereof for disengageable engagement with the bearing-forming means.

8. In combination, a container comprising a semi-cylindrical main part having end walls, each end wall having a radial projection and a bearing-forming recess formed on the axial center line of the container, a pair of auxiliary parts each semi-cylindrical in shape and of half the length of said main part, and hinge means for each of said auxiliary parts swingably connecting the same to said main part to enable said auxiliary parts to be swung alternatively to a closed position parallel to said main part or to a position in which they extend at right angles to said main part to form a handle, and a device rotatably and removably supported in said main part of said container to be exposed for use while in the container as an incident to swinging of said auxiliary parts from closed position to handle-forming position, said device comprising a core, a shaft-forming pin in each end of the core resiliently urged outwardly for engagement with the bearing-forming recess in the end walls of said main part, and means providing a tacky surface carried by said core.

LOREN K. HUTCHINSON.

REFERENCES CITED

The following references are of record in the file of this patent:

UNITED STATES PATENTS

| Number | Name | Date |
| --- | --- | --- |
| 564,739 | De Lent | July 28, 1896 |
| 1,052,539 | Welch | Feb. 11, 1913 |
| 1,665,955 | Gatewood | Apr. 10, 1928 |
| 2,057,720 | Kasdan et al. | Oct. 20, 1936 |
| 2,423,962 | Clark | July 15, 1947 |

FOREIGN PATENTS

| Number | Country | Date |
| --- | --- | --- |
| 641,525 | France | Apr. 21, 1928 |
| 468,989 | Germany | Nov. 28, 1928 |